United States Patent [19]

Ware

[11] Patent Number: 4,623,982
[45] Date of Patent: Nov. 18, 1986

[54] CONDITIONAL CARRY TECHNIQUES FOR DIGITAL PROCESSORS

[75] Inventor: Frederick A. Ware, Los Altos Hills, Calif.

[73] Assignee: Hewlett-Packard Company, Palo Alto, Calif.

[21] Appl. No.: 742,642

[22] Filed: Jun. 10, 1985

Related U.S. Application Data

[63] Continuation of Ser. No. 410,807, Aug. 23, 1982, abandoned.

[51] Int. Cl.[4] ............................................... G06F 7/50
[52] U.S. Cl. .................................. 364/788; 364/715; 364/770
[58] Field of Search .................... 364/788, 770, 715

[56] References Cited

U.S. PATENT DOCUMENTS

| | | | |
|---|---|---|---|
| 3,316,393 | 4/1967 | Ruthazer | 364/788 |
| 3,553,446 | 1/1971 | Kruy | 364/788 |
| 3,678,259 | 7/1972 | Kyser | 364/715 |
| 3,728,532 | 4/1973 | Pryor | 364/787 |
| 3,987,291 | 10/1976 | Gooding et al. | 364/787 |
| 3,989,940 | 11/1976 | Kihara | 364/770 |
| 4,110,832 | 8/1978 | Leininger et al. | 364/786 |
| 4,168,530 | 9/1979 | Gajski et al. | 364/760 |

FOREIGN PATENT DOCUMENTS

| | | |
|---|---|---|
| 81/00472 | 2/1981 | PCT Int'l Appl. . |
| 935376 | 8/1963 | United Kingdom . |
| 1103518 | 2/1968 | United Kingdom . |
| 1143886 | 2/1969 | United Kingdom . |
| 1391175 | 4/1975 | United Kingdom . |
| 1479939 | 7/1977 | United Kingdom . |

OTHER PUBLICATIONS

Bedrij, "Carry-Select Adder", *IRE Trans. on Electronic Computers*, Jun. 1962, pp. 340–346.
Hallins, "Pipelining of Arithmetic Functions", *IEEE Trans. on Computers*, Aug. 1972, pp. 880–886.
Millman, *Microelectronics*, McGraw-Hill Inc. 1979, pp. 170–171.
Sklansky, "Conditional-Sum Addition Logic", *IRE Trans. on Electronic Computers*, Jun. 1960, pp. 226–230.

*Primary Examiner*—David H. Malzahn
*Attorney, Agent, or Firm*—Jeffery B. Fromm

[57] ABSTRACT

A relatively small set of cells is shown for constructing a conditional carry adder for two N-digit operands. The structure and organization of the cells is adaptable for constructing any length adder with both high absolute performance and low circuit complexity in LSI by either bipolar or MOS techniques. In addition, the technique is shown adapted for use as either an incrementor or as a priority encoder.

6 Claims, 11 Drawing Figures

CONDITIONAL CARRY TECHNIQUES FOR DIGITAL PROCESSORS

CROSS REFERENCE TO RELATED APPLICATION

This application is a continuation of application Ser. No. 410,807, filed 8/23/82, now abandoned.

BACKGROUND OF THE INVENTION

The addition of two N-bit operands to form an N-bit result, often called "carry propagate addition", is a fundamental operation in digital processors. A variety of techniques have been developed to perform this operation.

A simple method for performing carry propagate addition is the ripple adder. The ripple adder requires relatively few transistors per bit, but it is usually a relatively slow technique. The ripple adder is thus the technique against which other methods are often measured.

Figure 1:
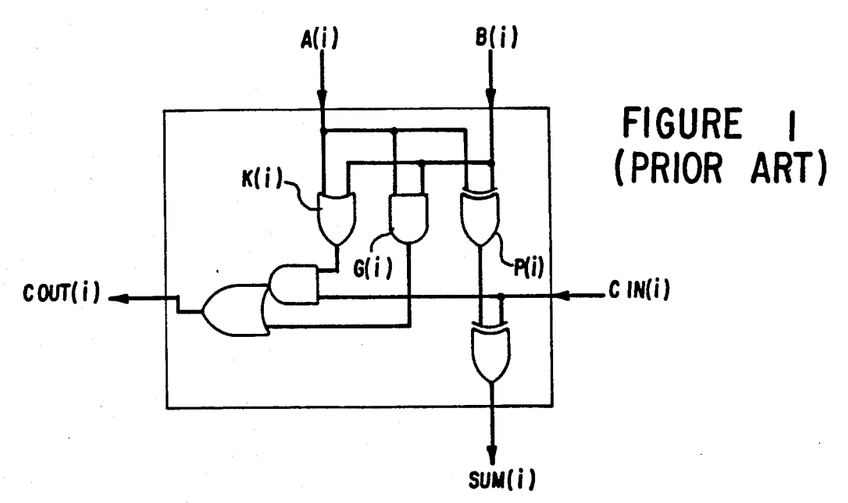
FIG. 1 shows a ripple adder cell for performing carry propagate addition according to the prior art.

FIG. 1 shows a typical ripple adder cell. $A(i)$ and $B(i)$ are individual bits of the two operands to be added, $Cin(i)$ is the carry-in signal from the prior adder cell, $Cout(i)$ is the carry-out signal from the present cell, and $Sum(i)$ is the sum signal of the present cell. The carry-out signal of one cell is the carry-in signal to the next cell. Table 1, shown as a PASCAL-like language program, summarizes the Boolean equations for the ripple adder method, where "+" is the Boolean "OR", "*" is the Boolean "AND", and "XOR" is the Boolean "Exclusive-OR":

TABLE 1

```
For  i = 0 through N-1 (N bit adder) DO BEGIN
     K(i) = A(i) + B(i)
     G(i) = A(i) * B(i)
     P(i) = A(i) XOR B(i)
     Cout(i) = G(i) + [K(i) * Cin(i)] = Cin(i+1)
     Sum(i) = P(i) XOR Cin(i)
End
```

Figure 2:
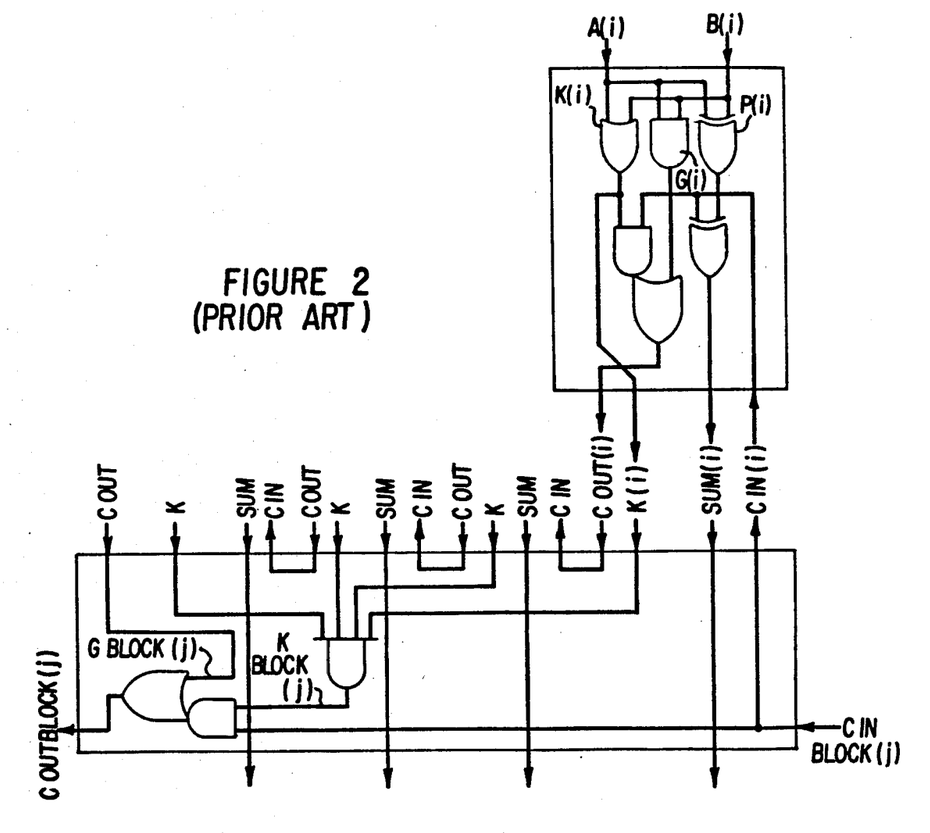
FIG. 2 shows the organization of cell blocks to perform the carry look ahead function according to the prior art.

The ripple adder may be sped up with the addition of "carry look ahead" circuitry. To implement a carry look ahead adder, the ripple adder cells are organized into blocks of, for example, four ripple adder cells. Each block of four ripple adder cells as shown in FIG. 2 is provided with additional gates which allow carry propagation across the entire block if the "K" bits are all 1 (i.e., the outputs of the OR gates $K(i)$). The carry look ahead adder is moderately fast and is economical to implement in MOS circuitry.

Another scheme is the "conditional sum" adder reported by Sklansky, "Conditional-Sum Addition Logic", I.R.E. Transactions on Electronic Computers, page 226, June 1960. Although very fast in operation, conditional sum addition takes far more logic to implement than the other, slower techniques discussed above. The result is that conditinal sum addition has a very high cost per bit. In practice, this technique has not enjoyed widespread usage.

Thus, several methods for performing N-bit addition have been used in the prior art. However, these known methods are often either too slow for the new generations of computers or they are substantially more complex and costly than is desirable.

SUMMARY OF THE INVENTION

Two embodiments of a new and novel circuit are disclosed for the conditional carry addition of two N-digit operands. The adder is organized as a series of cells which generate intermediate carry signals. These intermediate carry signals for each pair of bits can then ripple independently through subsequent stages so that the time delay of the entire adder will be substantially reduced over the prior art, while at the same time the circuit complexity can be kept relatively low. This technique is also shown adapted to produce either an incrementor or a priority encoder.

Since the technique is based on a relatively small number of cell types, the cells can readily be combined in an ordered manner as shown to produce an adder, incrementor, or priority encoder of any length. Thus, not only is it possible to produce a circuit with high absolute speed, it is also possible to produce a device with low design complexity and cost when implemented in LSI by either bipolar or MOS techniques.

DETAILED DESCRIPTION OF THE INVENTION

The present invention discloses two embodiments of a new and novel technique for performing N-bit addition which are called the "conditional carry" adder. Both of these techniques, "A" and "B", can also be applied to incrementors and priority encoders as well as adders as will be shown. As can be seen in Table 2, the conditional carry adder compares favorably to the previously known techniques. In Table 2 adder speed is stated in terms of the number of gate delays required for the total addition. The data shown is for a 32-bit adder.

Figure 3A:
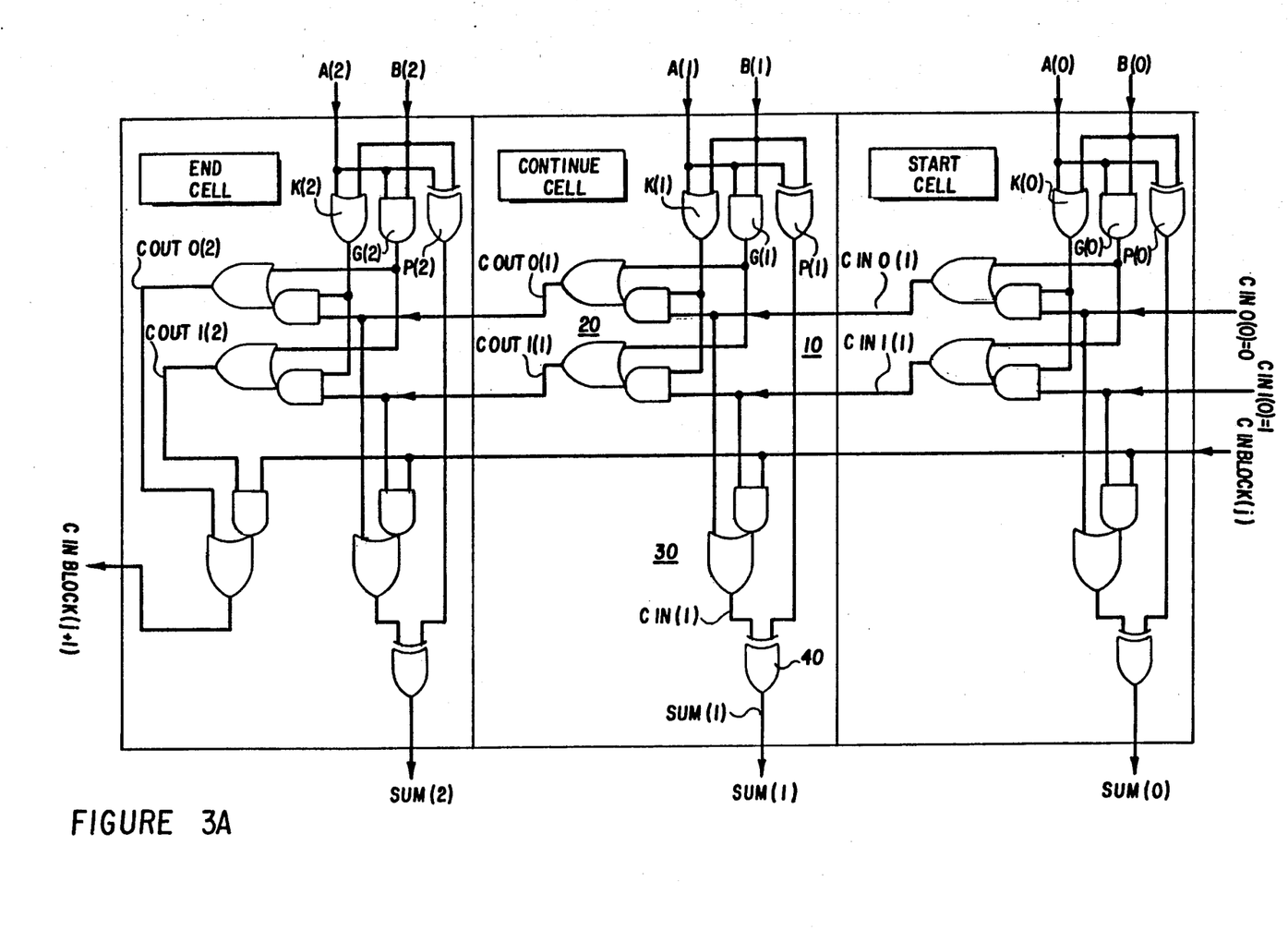
FIGS. 3A and 3B show the first embodiment of the present invention, the conditional carry adder "A".
Figure 3B:
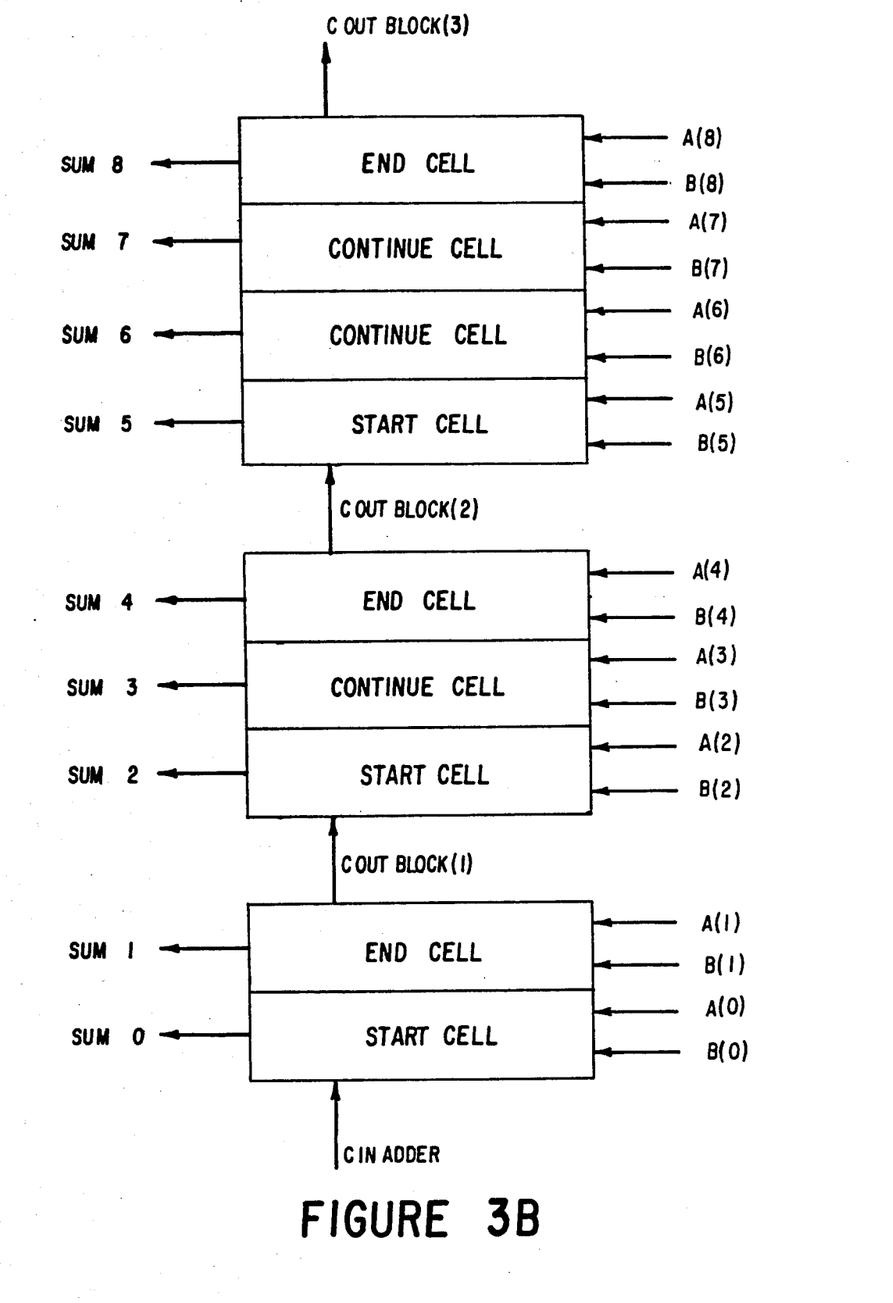

FIGS. 3A and 3B show the first embodiment of the claimed invention, the conditional carry adder "A", and Table 3 presents the related Boolean equations. The three different cell types are shown in FIG. 3A: A "start" cell, zero to any number of "continue" cells, and an "end" cell. FIG. 3B shows how these cells are arranged to form, for example, a 9-bit adder. In this example each block contains between two and four one-bit cells, with two cells in block 0, three cells in block 1, and four cells in block 2. Thus, for example, in the second block (j=1), where there are three cells, bit number 2 is a start cell, bit number 3 is a continue cell, and bit number 4 is an end cell.

TABLE 2

| Method for Performing Addition | Total Number of Delays | Number of Devices Per Bit Static NMOS | Number of Devices Per Bit Static CMOS |
|---|---|---|---|
| Ripple Adder | 33 | 20 | 26 |
| Carry Look Ahead Adder | 16 | 24 | 32 |
| Conditional Sum Adder | 14 | 72 | 104 |
| Conditional Carry Adder-A | 12 | 28 | 38 |
| Conditional Carry Adder-B | 8 | 36 | 52 |

TABLE 3

For the whole adder:
Cinblock(0) = Cinadder
For each block j:
Cin0(0) = 0
Cin1(0) = 1
Coutblock(j) = Cout0 (imax) + [Cout1(imax)*Cinblock(j)]
= Cinblock(j+1)
For each bit i of block j:
K(i) = A(i) + B(i)
G(i) = A(i) * B(i)
P(i) = A(i) XOR B(i)
Cout0(i) = G(i) + [K(i) * Cin0(i)] = Cin0 (i+1)
Cout1(i) = G(i) + [K(i) * Cin1(i)] = Cin1 (i+1)
Cin(i) = Cin0(i) + [Cin1(i) * Cinblock(j)]
Sum(i) = P(i) XOR Cin(i)

Fundamentally, each block, j=0-2 in the example, generates two ripple carry output signals Cout0(i) and Cout1(i). Note that the Cin0 and Cin1 for the start cell of each block is defined as 0 and 1 respectively. The Cout signals are combined with the carry-in signal to the current block Cinblock(j) to produce the carry-out signal of the current block Coutblock(j). All of the blocks j=0-2 begin rippling their two carry chains at the same time. Block 0 produces its carry-out signal first and passes it on to block 1. Thereafter, only one gate delay is required for the carry to "jump" across each block. Since the block size increases as an arithmetic progression (i.e., 2, 3, 4 and so forth), the total delay is approximately proportional to the square root of the number of bits to be added. Thus, the conditional carry adder "A" gives 25% better performance than the carry look adder with only a 17% increase in the number of devices per bit. Also, the conditional carry adder "A" can be implemented with one-bit cells, rather than cells which stretch across multiple bits as in other high speed techniques. This permits an ordered integrated circuit layout which is easy and space-efficient to implement.

Figure 4:
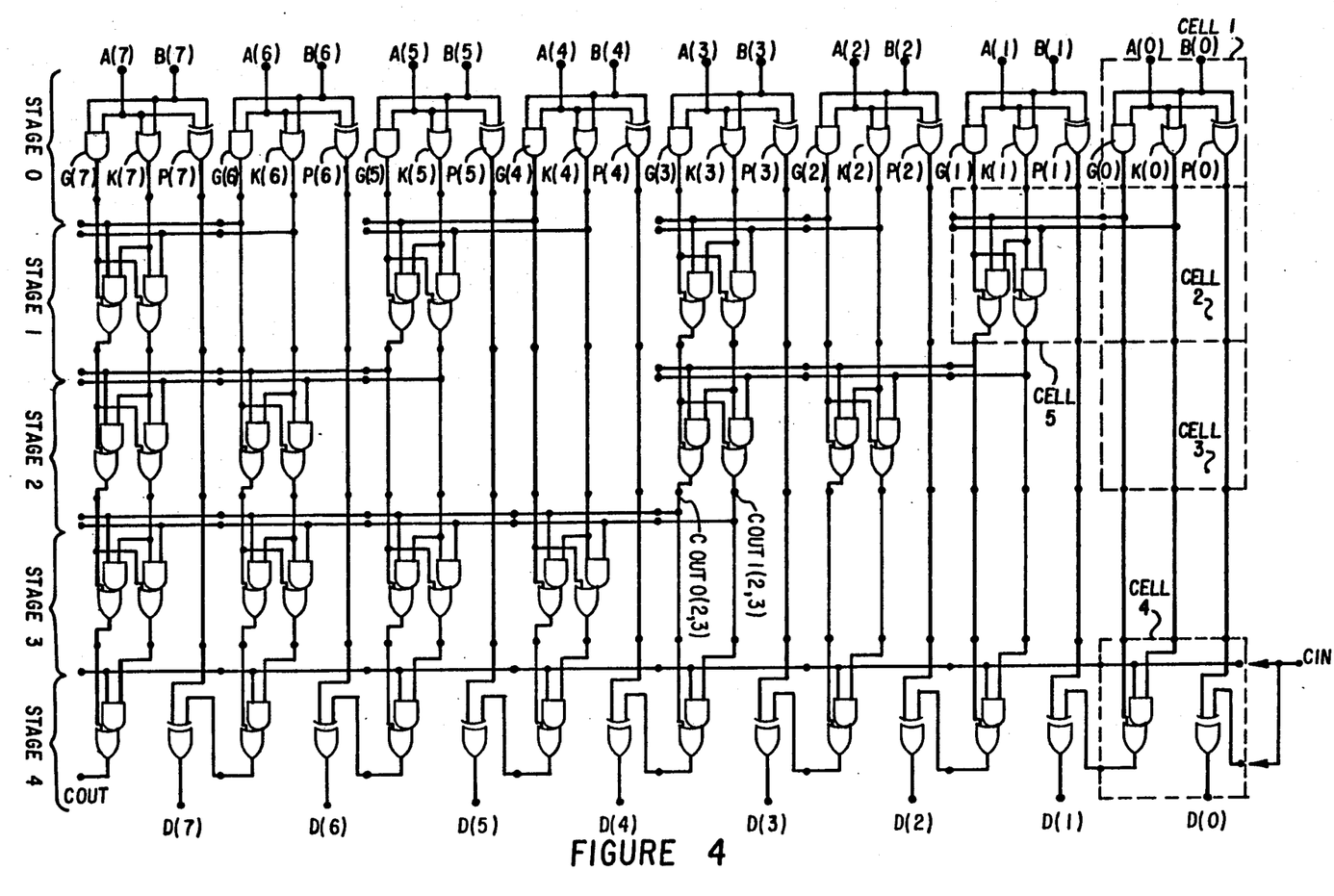
FIG. 4 shows the organization of a complete 8-bit conditional carry adder "B".

The second embodiment of the invention, the conditional carry adder "B", is shown in FIG. 4 and the related Boolean equations are shown in Table 4. Note that Table 4 is shown as a PASCAL-like language program for any length adder and "2**j" is equivalent to 2 raised to the jth power. The design is similar to the conditional carry adder "A" (FIGS. 3A and 3B) and in similar fashion the inputs are assumed to be Cin0=1 and Cin1=1 and the carry-out signals are computed accordingly.

TABLE 4

N = #Bits in Adder

TABLE 4-continued

For i = 0 thru (N-1) DO BEGIN
Cout0(0,i) = A(i) * B(i) = G(i)
Cout1(0,i) = A(i) + B(i) = K(i)
P(i) = A(i) XOR B(i)
End
For j = 1 thru LOG2(N) DO BEGIN
W = 2**j
For K = 0 thru (N/W -1) DO BEGIN
L0 = K*W
L1 = (K*W + W/2)
L2 = (K*W + W)
For i = (L0) thru (L1-1) DO BEGIN
Cout0(j,i) = Cout0(j-1, i)
Cout1(j,i) = Cout1(j-1, i)
End
For i = (L1) thru (L2-1) DO BEGIN
Cout0(j,i) = Cout0(j-1, i) + [Cout1(j-1, i) * Cout0(j-1, L1-1)]
Cout1(j,i) = Cout0(j-1, i) + [Cout1(j-1, i) * Cout1(j-2, L1-1)]
End
End
End
Cin(0) = CinAdder
K = LOG2(N)
For i = 0 thru (N-1) DO BEGIN
D(i) = P(i) XOR Cin(i)
Cin(i+1) = Cout0(K,i) + [Cout1(K,i) * CinADDER]
End
CoutADDER = Cin(N)

In FIG. 4 each stage generates the carry-out signals for each bit Cout0(j,i) and Cout1(j,i) assuming that the carry-in signals to that bit are zero and one respectively, where "j" is the stage number and "i" is the bit number. The object is to generate the carry-in signals for each bit as if the carry-in signals to the entire block of bits are a one and a zero respectively. The successive stages perform this function, as well as generating the carry-out signals for the block, Cout1 and Cout0.

FIG. 4 shows that when the final carry-in signals for each bit are generated, the carry-in signal for the adder selects the correct carry-in signal for each bit, and Cin is exclusive-ORed with the appropriate P-bit P(0-7) to produce the final sum D(0-7).

As can be seen from FIG. 4 the major difference between embodiment "B" and embodiment "A" is that in "B" the block sizes increase as powers of two, which forms a geometric progression whereas the block size of embodiment "A" forms an arithmetic progression as discussed above. The total delay in embodiment "B" is thus proportional to the logarithm to the base two of the number of bits to be added.

The technique of both adders "A" and "B" can be adapted to produce both an incrementor or a priority encoder. An incrementor is a device for adding 1 to a prior N-bit number; and a priority encoder is a device that encodes the highest priority input of N bits to a coded output having fewer than N bits to which a numerical weight has been assigned (e.g., an eight-digit to three-digit encoder or a 10-digit to 4-digit encoder).

Figure 5:
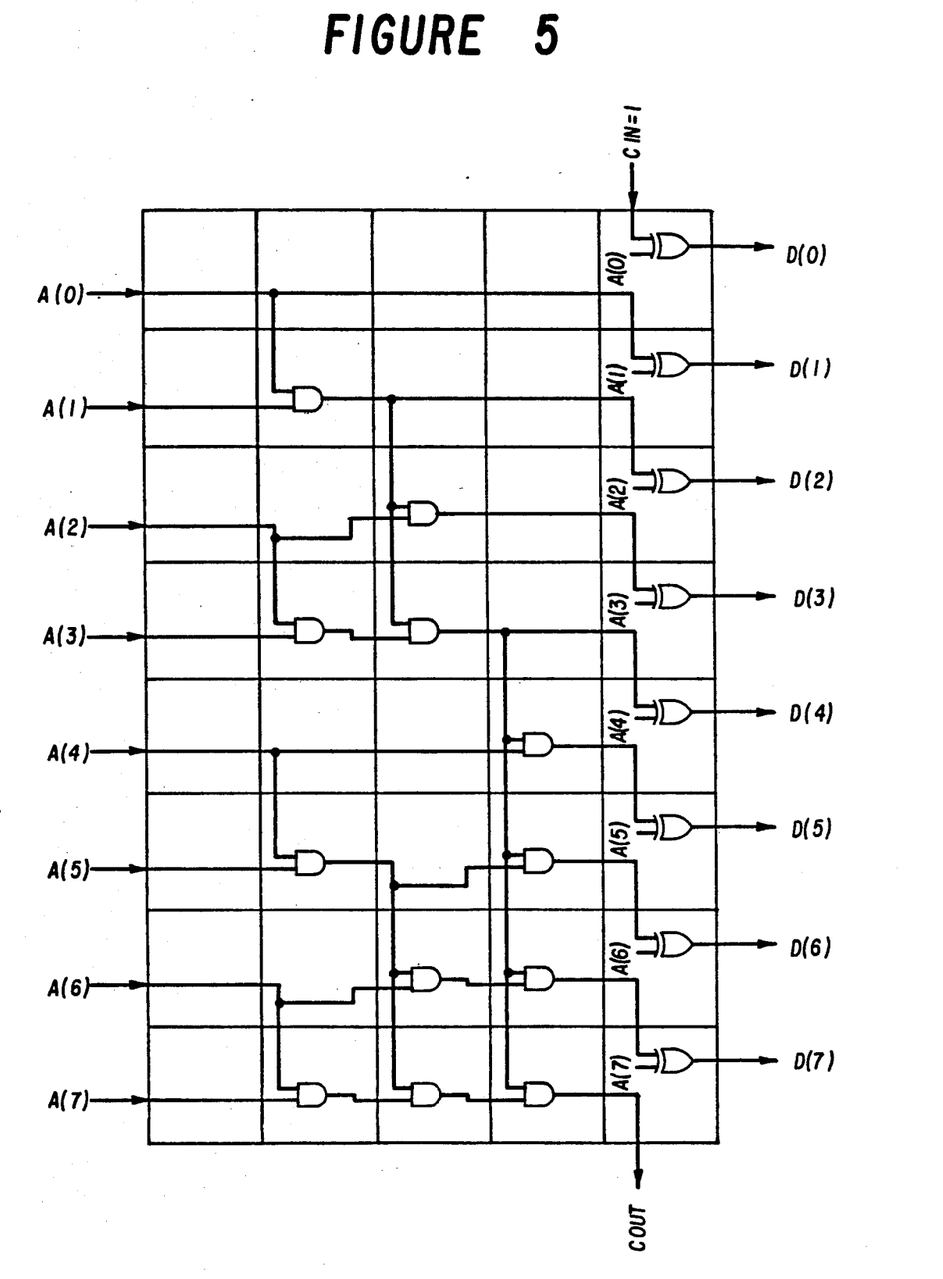
FIG. 5 shows an 8-bit incrementor using the conditional carry adder "B" technique.

FIG. 5 shows an incrementor using the conditional carry "B" technique. Since none of the B(0-7) inputs are used in an incrementor, they can be set to zero and when B=0:

$$G = A*B = 0$$

$$K = A + B = A$$

$$P = A \text{ XOR } B = A$$

Figure 6:
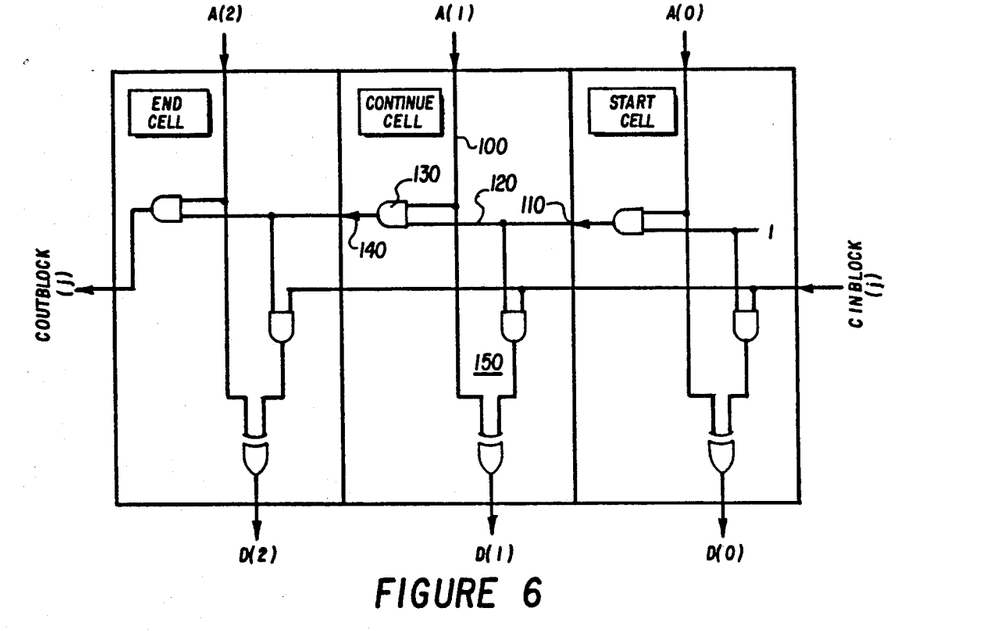
FIG. 6 shows the cells used for producing an incrementor using the conditional carry adder "A" technique.
Figure 6A:
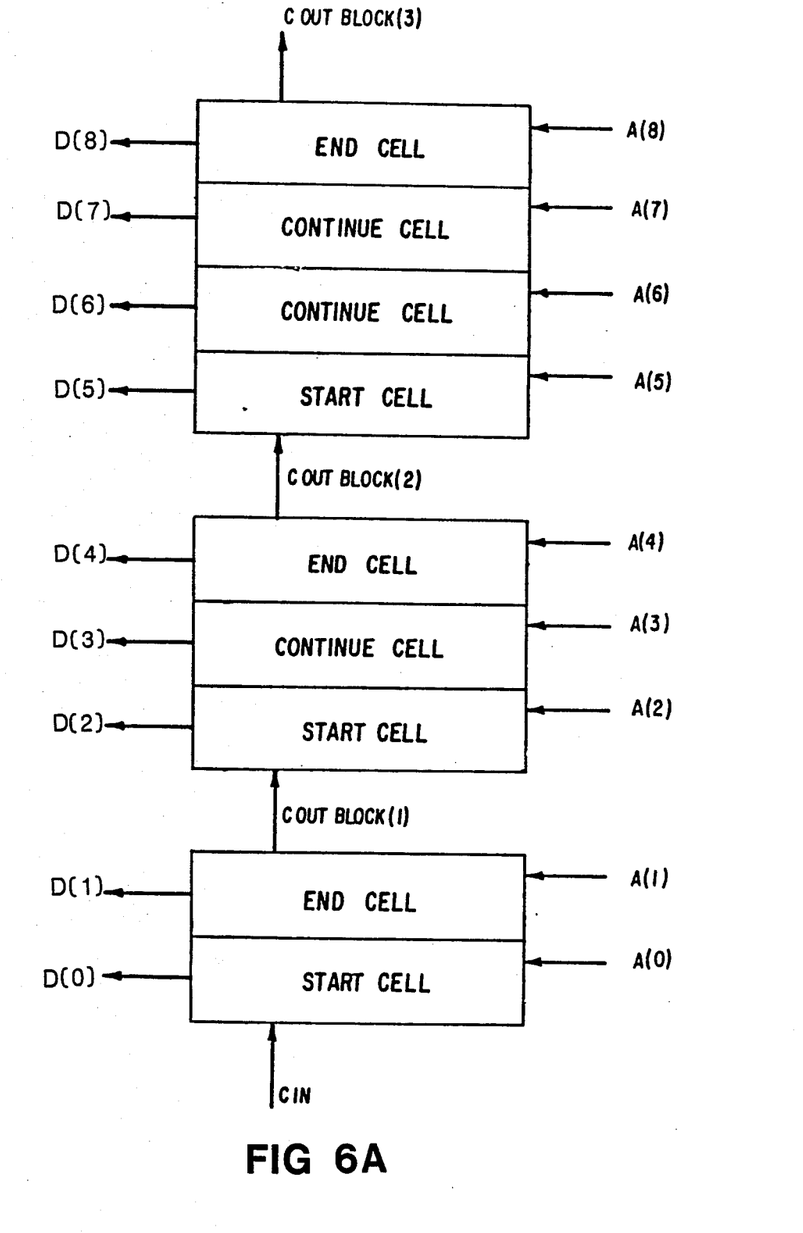
FIG. 6A shows a complete 9-bit incrementor using the cells of FIG. 6.

In like fashion the Cin signal can be set to 1 for an incrementor if the incrementor is always to be enabled. Thus, all of the logically redundant gates can be removed from the conditional carry adder "B" shown in FIG. 4 to form an incrementor "B" as shown in FIG. 5. This same technique for removal of redundant gates can be used as shown in FIGS. 6 and 6A to create an incrementor "A" based on the conditional carry adder "A" of FIG. 3A. As with the adder of FIGS. 3A and 3B the Continue cell of FIG. 6 can be used many times as needed in each block.

Figure 7:
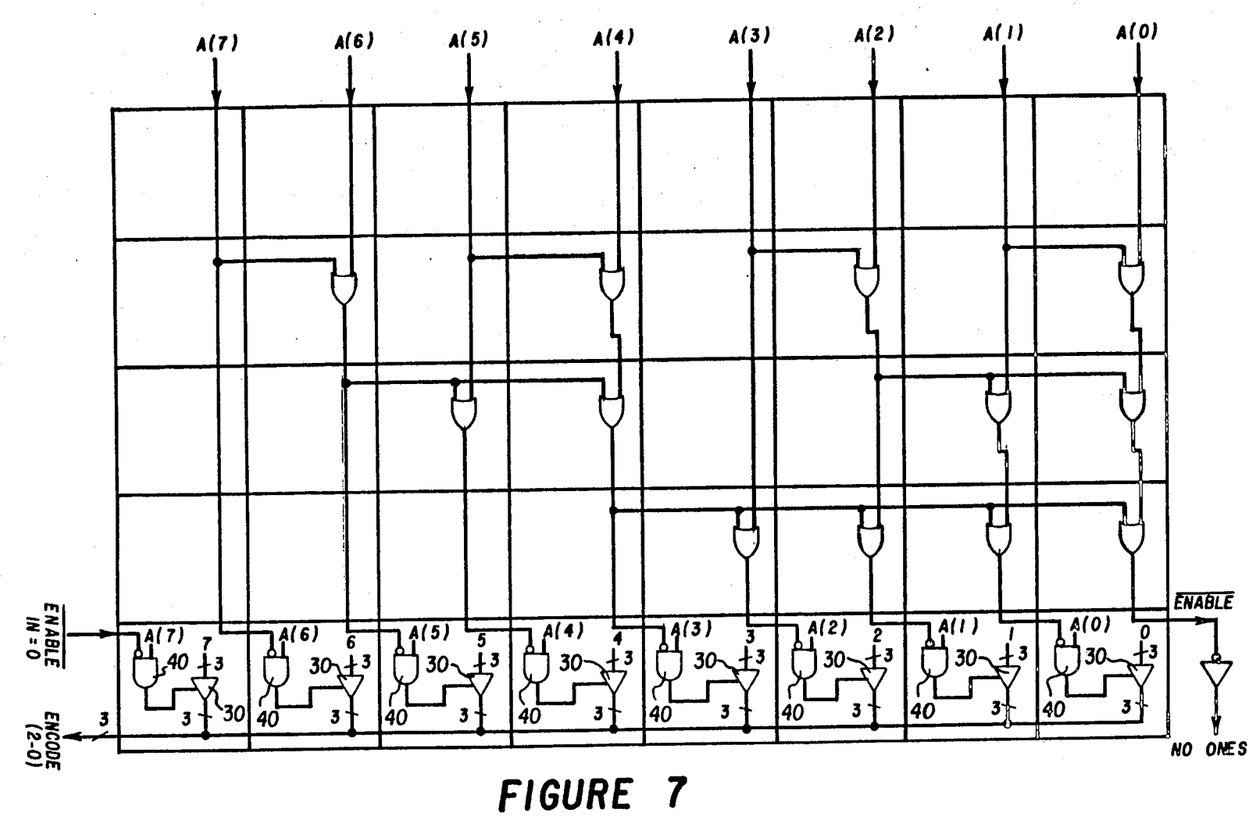
FIG. 7 shows a complete 8-bit to 3-bit priority encoder using the conditional carry adder "B" technique.
Figure 8:
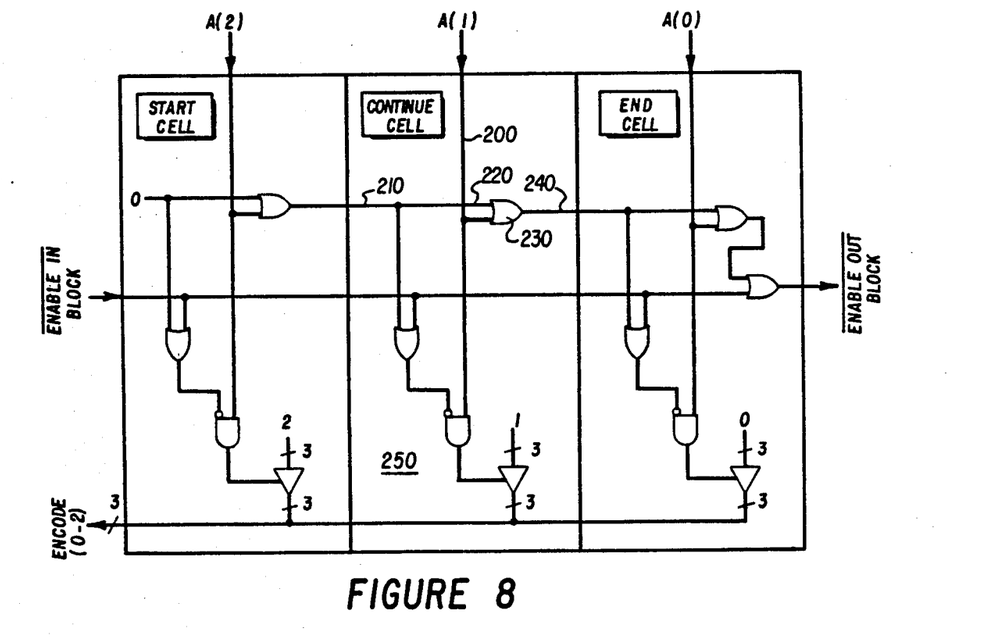
FIG. 8 shows the cells used for producing a priority encoder using the conditional carry adder "A" technique.
Figure 8A:
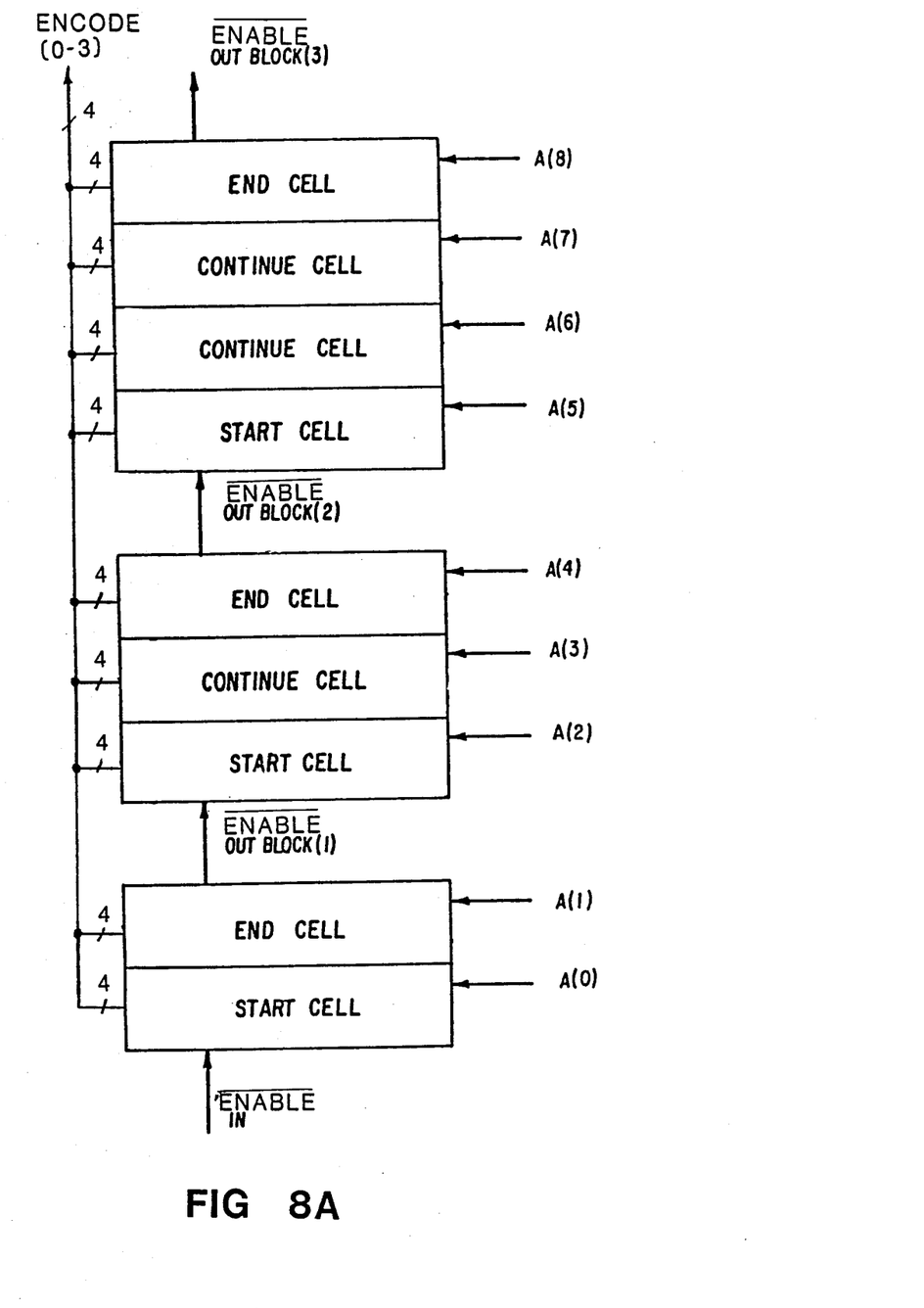
FIG. 8A shows a complete 9-bit to 4-bit priority encoder using the cells of FIG. 8.

FIG. 7 shows an eight-digit to three-digit priority encoder using the conditional carry "B" technique. As with the incrementors discussed above, the B(0-7) inputs are set to zero and the carry-in signal is set to 1. Note that in this embodiment the carry-in signal is shown as an "enable" and has been inverted for convenience as $\overline{ENABLE}=0$. Tri-state buffers 30 have been included in each output cell which are enabled by the corresponding gates 40. The logic elements in the first four rows insure that the only buffers 30 which will be enabled correspond to the most significant bit in the input operand having a value equal to one. The inputs to each tri-state buffer 30 in each output cell are hard wired to the appropriately binary weighted signals corresponding to the bit number of the respective operand inputs. Thus, for a three digit output each of the buffers 30 is formed by three buffers wired in parallel to form three output ENCODE lines. The tri-state buffers 30 in the A(0) column are then set to 0,0,0, the buffers 30 in the A(1) column are set to 0,0,1, and so forth up to the buffers 30 in the A(7) column being set to 1,1,1. The eight buffers 30 (one from each column) corresponding to the least significant inputs are then wired together to form the ENCODE(0) output, the eight buffers 30 (one from each column) corresponding to the intermediate weighted inputs are wired together to form the ENCODE(1) output, and the eight buffers 30 (one from each column) corresponding to the most significant inputs are wired together to form the ENCODE(2) output. Hence, the three encode lines provide the properly weighted outputs to perform the 8-bit to 3-bit encoder function and the properly enabled buffers provide the required priority corresponding to the most significant one in the input word. As with the incrementors discussed above the technique for removal of redundant gates, along with the addition of the appropriate number tri-state buffers per bit can be used as shown in FIGS. 8 and 8A to create a priority encoder "A" based on the conditional carry adder "A" of FIG. 3A. Once again the Continue cell of FIG. 8 can be used many times as needed in each block.

I claim:

1. A circuit for the addition of two N-digit operands, said circuit comprising a pluraity of blocks comprising:
 a plurality of start/continue cell means for starting and continuing each block, each start/continue cell means having
  first input means for accepting a first pair of digits, each from one of each of said two N-digit operands to provide a plurality of first logic output signals,
  first carry means for combining at least a portion of the first logic output signals from the first input means and a first pair of carry-in signals to provide a first pair of carry-out signals,
  first block carry means for coupling a first block carry signal through the start/continue cell means, and
  first summation output means for combining at least one logic output signal from the first input means, the first block carry signal and the first pair of carry-in signals to provide a first output summation digit; and
 a plurality of end cell means for ending each block, each end cell means having
  second input means for accepting a second pair of digits, each from one of said two N-digit operands to provide a plurality of second logic output signals,
  second carry means for combining at least a portion of the second logic output signals from the second input means and a second pair of carry-in signals from a preceding cell means to provide a second pair of carry-out signals,
  second block carry means for combining the second pair of carry out signals with a second block carry signal to provide a final block carry signal, and
  second summation output means for combining at least one logic output signal from the second input means, the second block carry signal and the second pair of carry-in signals to provide a second output summation digit;
 said circuit characterized in that the plurality of blocks are coupled in series only by one of the final block carry signals; further characterized in that each block has a variable number of series connected start/continue cell means, which variable number of start/continue cell means are coupled in series to each other by pairs of the first pair of carry-out signals and one of the first block carry signals, and the final start/continue cell means in each block being coupled in series by one of the pair of the first pair of carry-out signals and one of the first block carry signals to one of the end cell means; and further characterized in that the variable number of start/continue cell means in succeeding blocks increases as an arithmetic progression.

2. A circuit for incrementing an N-digit operand, said circuit comprising a plurality of blocks comprising:
 a plurality of start/continue cell means for starting and continuing each block, each start/continue cell means having
  first input means for accepting a first digit from said N-digit operand to provide a first logic output signal,
  first carry means for combining the first logic output signal from the first input means and a first carry-in signal to provide a first carry-out signal,
  first block carry means for coupling a first block carry signal through the start/continue cell means, and
  first increment output means for combining the logic output signal from the first input means, the first block carry signal and the first carry-in signal to provide a first output incremented digit; and
 a plurality of end cell means for ending each block, each end cell means having
  second input means for accepting a second digit from said N-digit operand to provide a second logic output signal,
  second carry means for combining the second logic output signal from the second input means and a second carry-in signal from a preceding cell means to provide a second carry-out signal, second increment output means for combining the logic output signal from the second input means, the second block carry signal and the second carry-in signal to provide a second output incremented digit;

said circuit characterized in that the plurality of blocks are coupled in series only by one of the final block carry signals; further characterized in that each block has a variable number of series connected start/continue cell means, which variable number of start/continue cell means are coupled in series to each other by one of the first carry-out signals and one of the first block carry signals, and the final start/continue cell means in each block being coupled in series by one of the first carry-out signals and one of the first block carry signals to one of the end cell means; and further characterized in that the variable number of start/continue cell means in succeeding blocks increases as an arithmetic progression.

3. A circuit for priority encoding an N-digit operand, said circuit comprising a plurality of blocks comprising:

a plurality of start/continue cell means for starting and continuing each block, each start/continue cell means having first input means for accepting a first digit from said N-digit operand to provide a first logic output signal, first carry means for combining the first logic output signal from the first input means and a first carry-in signal to provide a first carry-out signal, first block enable means for coupling a first block enable signal through the start/continue cell means, and first encoder output means for combining the logic output signal from the first input means, the first block enable signal, the first carry-in signal, and a first binary weighting signal to provide a first plurality of encoded output signals; and a plurality of end cell means for ending each block, each end cell means having second input means for accepting a second digit from said N-digit operand to provide a second logic output signal, second carry means for combining the second logic output signal from the second input means and a second carry-in signal from a preceding cell means to provide a second carry-out signal, second block enable means for combining the second carry out signal with a second block enable signal to provide a final block enable signal, and second encoder output means for combining the logic output signal from the second input means, the second block enable signal, the second carry-in signal, and a second binary weighting signal to provide a second plurality of encoded output signals;

said circuit characterized in that the plurality of blocks are coupled in series only by one of the final block enable signals and by the plurality of encoded output signals; further characterized in that each block has a variable number of series connected start/continue cell means, which variable number of start/continue cell means are coupled in series to each other by one of the first carry-out signals, one of the first block enable signals, and the plurality of encoded output signals, and the final start/continue cell means in each block being coupled in series by one of the first carry-out signals, one of the first block enable signals and the plurality of encoded output signals to one of the end cell means; and further characterized in that the variable number of start/continue cell means in succeeding blocks increases as an arithmetic progression.

4. A circuit for the addition of two N-digit operands, said circuit comprising:

one input row having a plurality of first cell means, each of said first cell means for accepting a first pair of digits from one of each of said two N-digit operands to provide a plurality of first logic output signals to adjacent cell means in subsequent rows;

a plurality of intermediate rows having a plurality of second, third and fourth cell means, said second cell means for passing selected ones of logic output signals from an adjacent cell means in an immediately preceding row to an adjacent cell means in the same row and for passing selected ones of logic output signals from the adjacent cell means in the immediately preceding row to an adjacent cell means in a subsequent row, said third cell means for passing selected ones of logic output signals from an adjacent cell means in an immediately preceding row to an adjacent cell means in a subsequent row and for combining selected portions of the logic output signals from the adjacent cell means in the immediately preceding row and selected portions of the logic output signals from the adjacent cell means in the same row to provide a pair of first carry-out signals to an adjacent cell means in a subsequent row, and said fourth cell means for passing selected ones of logic output signals from an adjacent cell means in an immediately preceding row to an adjacent cell means in a subsequent row; and one output row having a plurality of fifth cell means, said fifth cell means for combining selected logic output signals from an adjacent cell means in a preceding row and a second carry-in signal to produce a final output summation digit;

said circuit characterized in that the plurality of intermediate rows are coupled between the input and output rows; and further characterized in that a first intermediate row has selected ones of the second, third and fourth cell means repeating every R-th position, that a second intermediate row coupled to the first intermediate row has selected ones of the second, third and fourth cell means repeating every S-th position, that a third intermediate row coupled to the second intermediate row has selected ones of the second, third and fourth cell means repeating every T-th position, and the length (R, S, T) of the repeating pattern of positions in succeeding intermediate rows increases as powers of two to form a geometric progression.

5. A circuit for incrementing an N-digit operand, said circuit comprising:

one input row having a plurality of first cell means, each of said first cell means for accepting a first digit from said N-digit operand to provide a first logic output signal to adjacent cell means in subsequent rows;

a plurality of intermediate rows having a plurality of second, third and fourth cell means,
said second cell means for passing a logic output signal from an adjacent cell means in an immediately preceding row to an adjacent cell means in the same row and for passing the logic output signal from the adjacent cell means in the immediately preceding row to an adjacent cell means in a subsequent row,
said third cell means for combining a logic output signal from an adjacent cell means in an immediately preceding row and a logic output signal from an adjacent cell means in the same row to provide a first carry-out signal to an adjacent cell means in a subsequent row, and
said fourth cell means for passing a logic output signal from an adjacent cell means in an immediately preceding row to an adjacent cell means in a subsequent row; and
one output row having a plurality of fifth cell means, said fifth cell means for combining one of a logic output signal from an adjacent cell means in the same row and a second carry-in signal, and selected ones of the first logic output signals from the first cell means in the first row to produce a final output incremented digit;
said circuit characterized in that the plurality of intermediate rows are coupleed between the input and output rows; and further characterized in that a first intermediate row has selected ones of the second, third and fourth cell means repeating every R-th position, that a second intermediate row coupled to the first intermediate row has selected ones of the second, third and fourth cell means repeating every S-th position, that a third intermediate row coupled to the second intermediate row has selected ones of the second, third and fourth cell means repeating every T-th position, and the length (R, S, T) of the repeating pattern of positions in succeeding intermediate rows increases as powers of two to form a geometric progression.

6. A circuit for priority encoding an N-digit operand, said circuit comprising:
one input row having a plurality of first cell means, each of said first cell means for accepting a first digit from said N-digit operand to provide a first logic output signal to adjacent cell means in subsequent rows;
a plurality of intermediate rows having a plurality of second, third and fourth cell means,
said second cell means for passing a logic output signal from an adjacent cell means in an immediately preceding row to an adjacent cell means in the same row and for passing the logic output signal from the adjacent cell means in the immediately preceding row to an adjacent cell means in a subsequent row,
said third cell means for combining a logic output signal from an adjacent cell means in an immediately preceding row and a logic output signal from an adjacent cell means in the same row to provide a first carry-out signal to an adjacent cell means in a subsequent row, and
said fourth cell means for passing a logic output signal from an adjacent cell means in an immediately preceding row to an adjacent cell means in a subsequent row; and
one output row having a plurality of fifth cell means, said fifth cell means for combining a logic output signal from an adjacent cell means in the same row, selected ones of the first logic output signals from the first cell means in the first row, and a binary weighting signal to provide a plurality of encoded output signals;
said circuit characterized in that the plurality of intermediate rows are coupled between the input and output rows; and further characterized in that a first intermediate row has selected ones of the second, third and fourth cell means repeating every R-th position, that a second intermediate row coupled to the first intermediate row has selected ones of the second, third and fourth cell means repeating every S-th position, that a third intermediate row coupled to the second intermediate row has selected ones of the second, third and fourth cell means repeating every T-th position, and the length (R, S, T) of the repeating pattern of positions in succeeding intermediate rows increases as powers of two to form a geometric progression.

* * * * *